May 13, 1958 R. E. RIDDLE ET AL 2,834,438
AUTOMATIC BRAKE SETTING DEVICE
Filed May 19, 1955 2 Sheets-Sheet 1
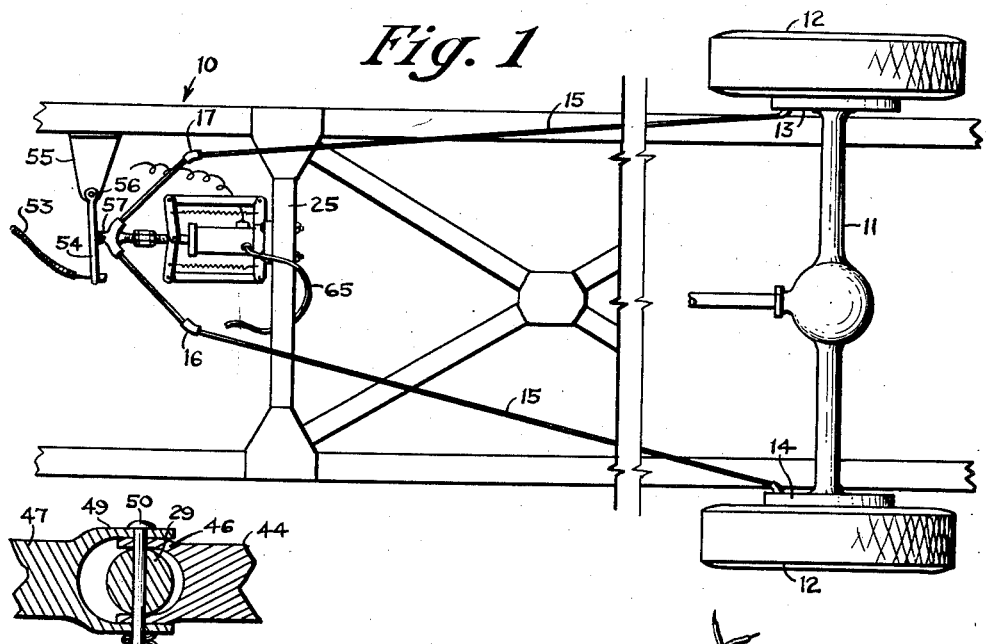
Fig. 1
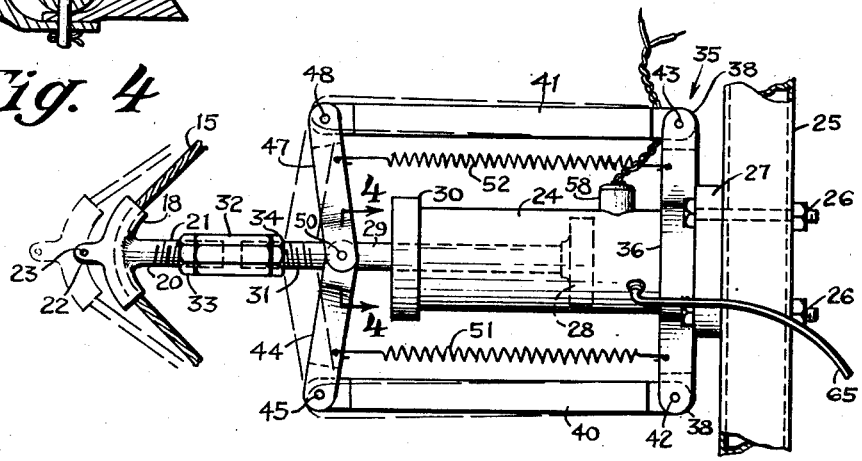
Fig. 4
Fig. 2
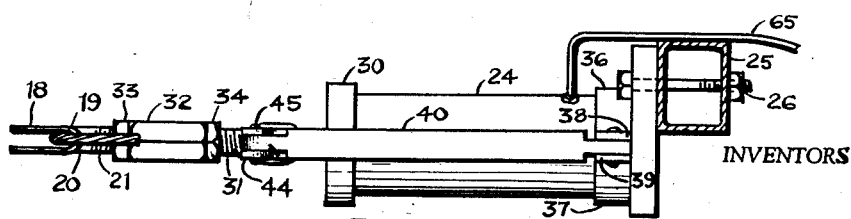
Fig. 3
INVENTORS
ROBERT E. RIDDLE & GEORGE R. LEE
BY Kimmel & Crowell
ATTORNEYS May 13, 1958          R. E. RIDDLE ET AL          2,834,438
                    AUTOMATIC BRAKE SETTING DEVICE
Filed May 19, 1955                          2 Sheets-Sheet 2

INVENTORS
ROBERT E. RIDDLE &
GEORGE R. LEE
BY Kimmel & Crowell
ATTORNEYS

United States Patent Office 2,834,438
Patented May 13, 1958

2,834,438

AUTOMATIC BRAKE SETTING DEVICE

Robert E. Riddle and George R. Lee, St. Marys, Ga.

Application May 19, 1955, Serial No. 509,458

1 Claim. (Cl. 188—152)

The present invention relates to devices for automatically setting the parking or emergency brakes of a vehicle.

The primary object of the invention is to provide a parking brake setting mechanism which applies the brake when the ignition key is turned to ignition off position.

Another object of the invention is to provide a structure of the type described above wherein hydraulic pressure is utilized to force the brake shoes into engagement with the brake drum.

A further object of the invention is to provide a brake setting device wherein an electrically driven pump furnishes fluid under pressure to the brake applying mechanism.

A still further object of the invention is to provide a device of the above character in which an electrically operated manually controlled release is utilized to release the brakes.

Other objects and advantages will become apparent in the following specification when read in light of the attached drawings, in which:

Figure 1 is a fragmentary top plan view of the invention applied to a conventional motor vehicle.

Figure 2 is an enlarged fragmentary top plan view of the hydraulic brake applying mechanism.

Figure 3 is a side elevation of the mechanism shown in Figure 2.

Figure 4 is a transverse cross-section taken on the line 4—4 of Figure 2, looking in the direction of the arrows.

Figure 5:
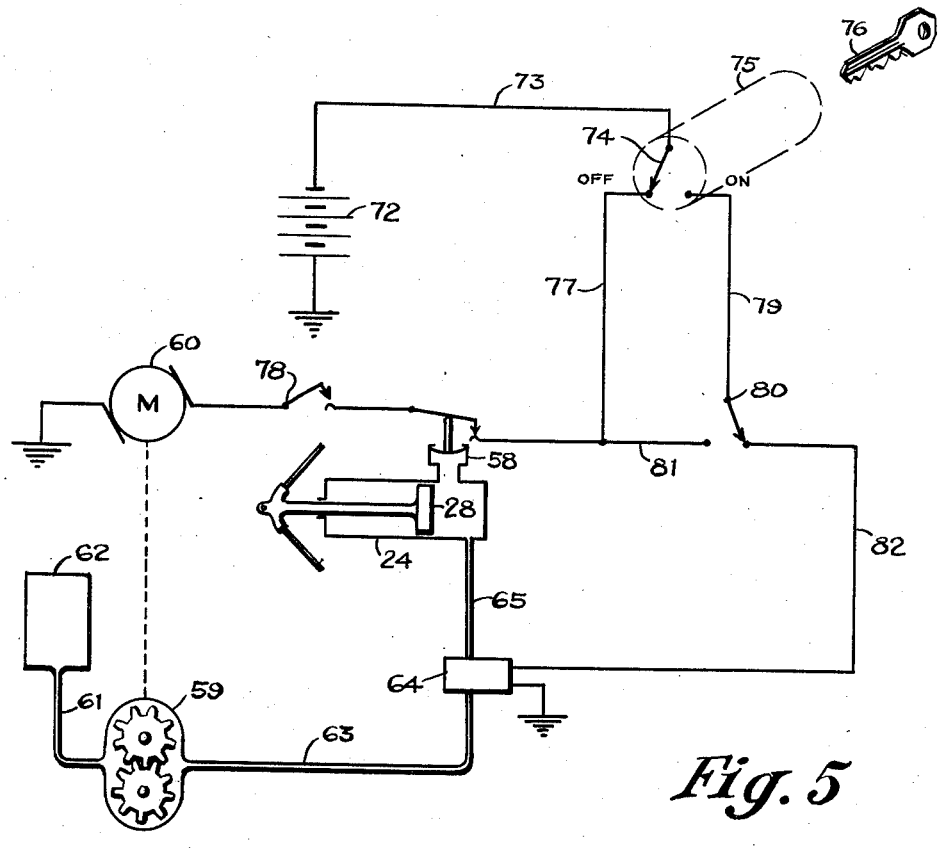
Figure 5 is a diagrammatic showing of the hydraulic system and the electric circuits.
Figure 6:
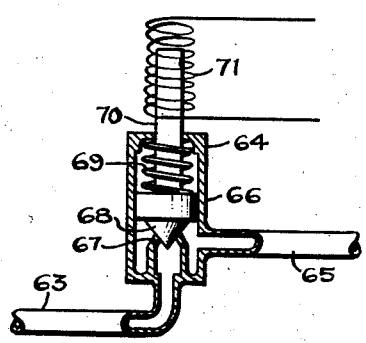
Figure 6 is a vertical cross-section of the release valve and valve control.

Referring now to the drawings in detail, wherein like reference numerals indicate like parts throughout the several figures, the reference numeral 10 indicates, generally, the frame of an automotive vehicle to which the invention is attached. The frame 10 has a rear axle 11 suspended therefrom in the usual manner, and a pair of wheels 12 are mounted on the opposite ends of the axle 11. A brake drum 13 of conventional construction is mounted on one end of the axle 11 and associated with one of the wheels 12, and a second brake drum 14 is mounted on the opposite end of the axle 11 and associated with the other wheel 12.

One brake shoe (not shown) in each of the brake drums 13 and 14 is adapted to be actuated by a cable 15 to act as a holding or parking brake. The cable 15 is continuous and extends from the brake drum 13 to the brake drum 14, passing through cable guides 16 and 17. A yoke 18 having an arcuate cable engaging groove 19 formed therein is positioned over the cable 15 at approximately the midpoint thereof. The cable 15 is adapted to slide within the yoke 18 to equalize the pressures applied to the brake shoes in the brake drums 13 and 14. The yoke 18 has a stem 20 extending oppositely of the cable engaging groove 19. The stem 20 has a screw threaded outer end 21. The yoke 18 is further provided with a hand brake attaching lug 22 which has an opening 23 extending therethrough.

A hydraulic cylinder 24 is mounted on a cross member 25 of the frame 10 by means of attachment bolts 26, with the base 27 of the hydraulic cylinder 24 in engagement with the cross member 25. The hydraulic cylinder is provided with a piston 28 mounted therein and adapted for reciprocation therethrough. The piston 28 has a piston rod 29 connected thereto and extending through the head 30 of the hydraulic cylinder 24. The piston rod 29 is provided with a screw threaded outer end 31. A turnbuckle nut 32 is threaded onto the screw threaded outer end 31 of the piston rod 29 and onto the threaded end 21 of the stem 20, so that by turning the turnbuckle nut 32, the distance between the yoke 18 and the piston 28 might be varied. A jam nut 33 is positioned on the screw threaded end 21 for binding against the turnbuckle nut 32, and a jam nut 34 is threaded onto the screw threaded end 31 of the piston rod 29 to bear against the turnbuckle nut 32.

A bracket, generally indicated at 35, consists of a pair of cylinder encompassing members 36 and 37 having end extensions 38 and 39, respectively, on each side. The bracket end extensions 38 and 39 are spaced apart slightly and adapted to receive therebetween support arms 40 and 41, respectively. The arm 40 is pivoted to the bracket 35 by means of pivot 42, while the arm 41 is pivoted to the bracket 35 by means of pivot 43.

A toggle lever 44 is pivoted at 45 to the outer end of the lever 40 and the inner end thereof is bifurcated as at 46, as shown in Figure 4. A second toggle lever 47 is pivoted at 48 to the outer end of the lever 41 and has its inner end bifurcated as at 49, as shown in Figure 4. The space between the bifurcations 49 of the lever 47 is greater than the space between the bifurcations 46 of the lever 44, so that the bifurcations 46 may fit between the bifurcations 49. The bifurcations 46 and 49 are positioned over the piston rod 29 and a pivot pin 50 is passed through the bifurcations 46 and 49 and the piston rod 29, all as shown in Figure 4.

The bracket 35 and the toggle lever 44 have a tension coil spring 51 extending therebetween normally biasing the toggle lever 44 toward the bracket 35. A second coil spring 52 extends between the bracket 35 and the toggle lever 46, likewise normally biasing the toggle lever 47 toward the bracket 35, thus returning the piston 28 to released position.

A conventional hand brake cable 53 extends from a conventional hand brake operator (not shown) and connects to the outer end of lever arm 54. A bracket 55 is secured to the frame 10 and the lever arm 54 is pivotally secured to the bracket 55 by a pivot 56. A pivot 57 secures the hand brake attaching lug 22 to the lever 54, so that movement of the hand brake cable 53 will apply the brakes in the brake drums 13 and 14.

A normally closed pressure-opened switch 58 is secured to the cylinder 24 so that hydraulic pressure within the cylinder 24 may open the switch 58. The hydraulic pump 59 is driven by an electric motor 60. A hydraulic line 61 connects the hydraulic pump 59 with a reservoir 62. A second hydraulic line 63 connects the hydraulic pump with a release valve 64. The release valve 64 is connected to the pressure side of the hydraulic cylinder 24 by means of a hydraulic line 65. The release valve 64 comprises a body 66 having a valve seat 67 and a valve 68 cooperating therewith. A spring 69 engages the valve 68 and normally biases it to a valve seat 67 engaging position. A valve stem 70 extends from the valve 68 through the housing 66 and is adapted to be moved by a solenoid 71, whereby the valve 68 will be withdrawn from the valve seat 67 permitting fluid from the line 65 to flow back to the reservoir 62.

The electric motor 60 is energized by means of a battery 72. An electrical connection 73 extends from the battery 72 to a switch 74 associated with the ignition switch 75 of a motor vehicle. The ignition switch 75 is adapted to be operated by the conventional key 76. The switch 74 connects the wire 73 to a wire 77 when the ignition key 76 is turned to the ignition off position. The pressure-responsive switch 58 is interposed in the electric wire 77 between the battery 72 and the electric motor 60, and a second emergency cut-off switch 78 is interposed in the line 77 to render the brake applying circuits inoperative for purposes of moving the vehicle with the ignition key 76 in off position during tests and repairs. The switch 78 will be normally mounted in a hidden position on the vehicle to prevent unauthorized persons from rendering the brake applying system inoperative.

A second lead 79 from the switch 74 extends from the switch and is in contact therewith when the ignition key 76 is in on position. A double throw switch 80 is connected to the lead 79 and has extending therefrom a connection 81 to the wire 77 and a connection 82 extending to the solenoid 71 of the valve 64. The switch 80 when connected to the lead 82 causes the solenoid 71 to be energized and open the valve 68. When the switch 80 is connected to the lead 81, the motor 60 will be energized regardless of whether the ignition key 76 is in on or off position.

In the use and operation of the invention, the motor 60 will be energized whenever the switch 78 is closed and the ignition key 76 is in off position. The motor 60 will drive the pump 59 supplying hydraulic pressure to the cylinder 24, moving the piston 28 outwardly therein, thus applying the brakes in the brake drums 13 and 14. When the pressure in the cylinder 24 reaches a predetermined point, the pressure responsive switch 58 will be actuated, thus opening the circuit extending from the battery 72 to the motor 60, preventing further hydraulic fluid from entering the cylinder 24.

Should it be desirable to have the brakes applied while the ignition key 76 is on, the switch 80 can be thrown to engage the lead 81, thus connecting the battery to the motor 60, regardless of the position of the ignition key. When the switch 80 is in the position in contact with the lead 82, the brakes will be automatically released by the withdrawal of the valve 68 from the valve seat 67 when the ignition key 76 is turned to on position. The spring 69 in the valve 64 will effectively seat the valve 68 on the valve seat 67. However, fluid under pressure from the pump 59 will unseat the valve 68 and pass on through the line 65 to the cylinder 24.

Thus it can be seen that under the normal operation of the vehicle, with the switch 78 in closed position, the brakes will be applied automatically whenever the ignition key is turned to off position, and will be released automatically whenever the ignition key is turned to on position, so long as the switch 80 is in released position.

Having thus described the preferred embodiment of the invention, it should be understood that numerous modifications and structural adaptations may be resorted to without departing from the scope of the appended claim.

What is claimed is:

In combination with a motor vehicle of the type having a cable controlled parking brake assembly, a yoke engaging said cable intermediate its ends, a hydraulic cylinder fixedly secured to said vehicle, a piston positioned for reciprocation within said cylinder, a stem member integrally extending from said yoke, a piston rod connected to said piston and extending in axial alignment with said yoke, a sleeve, means adjustably connecting one end of said sleeve to said stem, means adjustably connecting the other end of said sleeve to said piston rod, a bracket member secured to said cylinder, oppositely projecting end extensions integrally formed on said bracket member, a pair of support arms pivotally connected at one end to each of said end extensions, a pair of toggle levers pivotally connected at one end to the other end of each of said support arms, said toggle levers extending inwardly from said support arms to said piston rod, means pivotally connecting said toggle levers together at their other ends and to said piston rod, a pair of oppositely disposed tension springs connected at one end to said bracket and at the opposite end to said toggle levers for normally biasing said toggle levers and said piston rod toward said bracket, a fluid pressure pump, conduits connecting said pump with said hydraulic cylinder, an electric motor for actuating said pump, a key controlled switch energizing said electric motor, means responsive to predetermined pressure in said hydraulic cylinder for deenergizing said electric motor, and means alternately energized by said key controlled switch to release the hydraulic pressure in said hydraulic cylinder to release said brakes.

References Cited in the file of this patent

UNITED STATES PATENTS

| | | |
|---|---|---|
| 1,412,009 | Lane | Apr. 4, 1922 |
| 1,972,659 | Kopay | Sept. 4, 1934 |
| 2,015,741 | Burton | Oct. 1, 1935 |
| 2,031,062 | Peabody et al. | Feb. 18, 1936 |
| 2,330,739 | Piron | Sept. 28, 1943 |
| 2,734,590 | Hays | Feb. 14, 1956 |